(12) United States Patent
Alcantara Burguete et al.

(10) Patent No.: US 8,474,920 B2
(45) Date of Patent: Jul. 2, 2013

(54) PROTECTIVE CAP FOR A VEHICLE WHEEL HUB

(75) Inventors: Avissai Alcantara Burguete, Mexico City (MX); Ricardo Guerrero Melendez, Mexico City (MX); Marcos Portillo Martinez, Puebla (MX)

(73) Assignee: GM Global Technology Operations LLC, Detroit, MI (US)

( * ) Notice: Subject to any disclaimer, the term of this patent is extended or adjusted under 35 U.S.C. 154(b) by 224 days.

(21) Appl. No.: 13/160,588

(22) Filed: Jun. 15, 2011

(65) Prior Publication Data

US 2012/0319461 A1 Dec. 20, 2012

(51) Int. Cl.
*F16C 33/72* (2006.01)
*B60B 7/06* (2006.01)

(52) U.S. Cl.
USPC .............. 301/37.105; 301/37.102; 384/448

(58) Field of Classification Search
USPC .............. 301/37.101, 37.102, 108.1, 108.2, 301/108.3, 5.301, 5.305, 5.309, 37.105; 384/448, 544, 584
See application file for complete search history.

(56) References Cited

U.S. PATENT DOCUMENTS

| | | | |
|---|---|---|---|
| 6,196,639 B1 * | 3/2001 | Di Ponio et al. | 301/105.1 |
| 8,132,968 B2 * | 3/2012 | Fukumura et al. | 384/544 |
| 2002/0007675 A1 * | 1/2002 | Yamashita | 73/493 |
| 2006/0239600 A1 * | 10/2006 | Shigeoka et al. | 384/544 |
| 2008/0144985 A1 * | 6/2008 | Joki et al. | 384/448 |

* cited by examiner

*Primary Examiner* — Kip T Kotter
*Assistant Examiner* — Jean Charleston

(57) ABSTRACT

A protective cap is installed in a wheel hub to protect a wheel speed sensor and bearing assembly from intrusion of dirt. The hub has inner and outer end faces, and a central bore having splines for engagement by a splined driveshaft. The speed sensor system has a segmented disc rotating with the hub and a sensor mounted on a housing and extending into proximity with the segmented disc. The protective cap includes a stem for insertion through the central bore and a head having an under face for engaging with the inner end face of the hub. The head has a distal rim portion overlapping the housing to allow rotation of the protective cap relative the housing to prevent entry of dirt to the speed sensor system and bearing. The stem has yieldable retainers for engaging with the outer end face of the hub to retain the protective cap.

14 Claims, 2 Drawing Sheets

PROTECTIVE CAP FOR A VEHICLE WHEEL HUB

FIELD OF THE INVENTION

The present invention relates to a wheel hub in a motor vehicle and more particularly provides a protective cap to prevent dirt intrusion into a wheel speed sensor and wheel bearing.

BACKGROUND OF THE INVENTION

Motor vehicles include rubber-tired wheels that are mounted on a rotating hub. The hub has a ball bearing assembly or roller bearing assembly that mounts the hub on a steering knuckle in the case of front wheels, or mounts the hub on an axle in the case of rear wheels. In modern motor vehicles, the wheel hubs are routinely equipped with a wheel speed sensing mechanism that will provide wheel speed data to an antilock brake controller. The wheel speed sensing mechanism includes a segmented disc with notches and a magnetic sensor that is positioned adjacent the notches.

The intrusion of dirt or road grime into the bearings will cause premature wear of the bearings. The intrusion of dirt, road grime, or of metallic particles into the segmented disc or sensor may interfere with the reliable operation of the wheel speed sensing mechanism.

In modern vehicles, the hub has a hollow central opening with splines in readiness for receiving a driveshaft. The driveshaft can be equipped with a slinger disc that protects the hub bearings and the wheel speed sensing mechanism from intrusion of dirt, road grime, or metallic particles. However, in those vehicles that are not equipped with the driveshaft and slinger disc, there is a need for a protective mechanism to prevent intrusion of dirt, road grime, or metallic particles.

Therefore, in view of the foregoing, it would be desirable to provide a protective cap that would be installed in the wheel hub to protect the wheel speed sensing mechanism and the hub bearing from intrusion of dirt, grime, and metallic particles.

SUMMARY OF THE INVENTION

A protective cap is installed in a wheel hub to protect a wheel speed sensor and bearing assembly from intrusion of dirt. The hub has inner and outer end faces, and a central bore having splines for engagement by a splined driveshaft. The speed sensor system has a segmented disc rotating with the hub and a sensor mounted on a housing and extending into proximity with the segmented disc. The protective cap includes a stem for insertion through the central bore and a head having an under face for engaging with the inner end face of the hub. The head has a distal rim portion overlapping the housing to allow rotation of the protective cap relative the housing to prevent entry of dirt to the speed sensor system and bearing. The stem has yieldable retainers for engaging with the outer end face of the hub to retain the protective cap.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
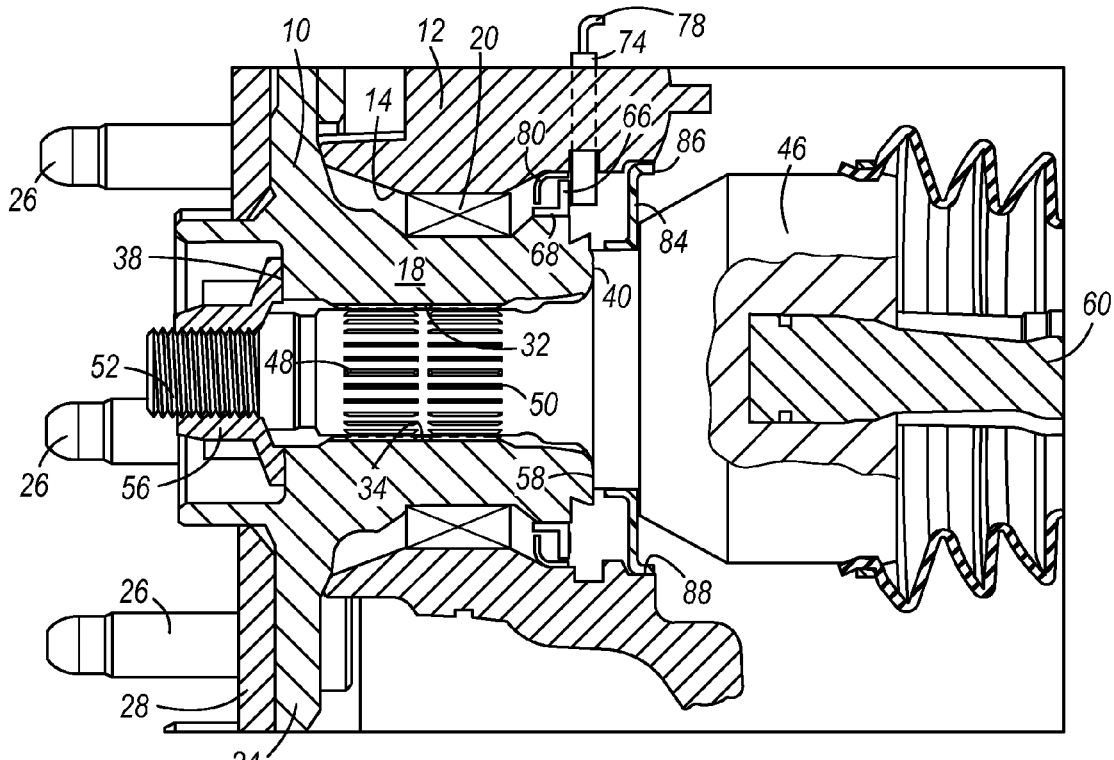
FIG. 1 is a cross-sectional view taken through a wheel have hub having a driveshaft connected thereto.

Referring to FIG. 1, a wheel hub 10 is rotatable within a housing 12. In the case of a front wheel, the housing 12 is typically a steering knuckle. In the case of a rear wheel, the housing 12 is typically an axle housing. The housing 12 has a bore 14. The hub 10 has an annular sleeve portion 18 that extends through the bore 14 of the housing 12. Bearing assembly 20 is provided between the housing 12 and the annular sleeve portion 18 to rotatably mount the hub 10 within the housing 12. Bearing assembly 20 can be a roller bearing assembly or he ball bearing assembly. The hub 10 has a wheel flange 24 that carries a plurality of lug bolts 26 for mounting the vehicle wheel, not shown. A brake disc or brake drum 28 fits over the lug bolts 26 and rotates with the hub 10.

As seen in FIG. 1, hub 10 has a central bore 32 with splines 34 provided on the interior of the central bore 32. The hub 10 has an outer end face 38 that faces outwardly toward the vehicle wheel, and an inner end face 40 that faces inwardly toward the center of the vehicle.

Figure 2:
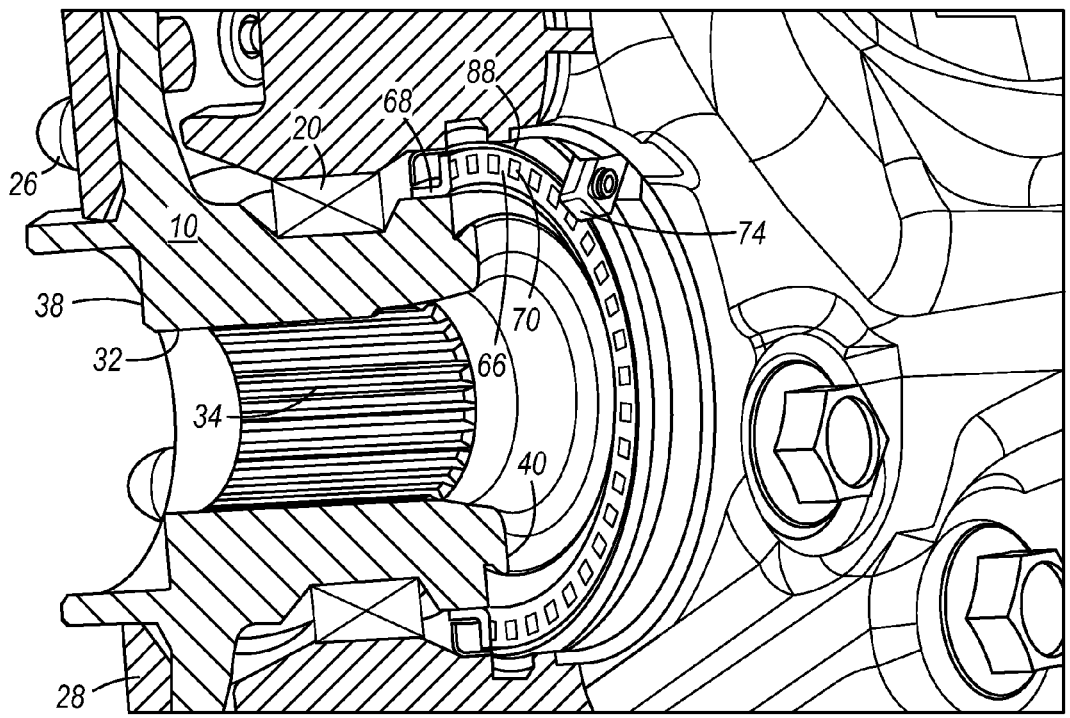
FIG. 2 is a view similar to FIG. 1 but shown without the installation of a driveshaft into the hub.

In FIG. 1, the hub 10 is shown as being a hub that is driven by the engine. In FIG. 2 the hub 10 is shown as being a hub that is not driven by the engine. Thus, in FIG. 1, a driveshaft 46 is installed into the central bore 32 of the hub 10. The driveshaft 46 has two rows of splines 48 and 50 that mate with the splines 34 formed in the central bore 32 of the hub 10. The outer end of the driveshaft 46 has a threaded end 52 and a nut 56 is installed on the threaded end 52. The nut 56 engages against the outer face 38 of the hub 10. The driveshaft 46 has a shoulder 58 that engages against the inner end face 40 of the hub 10. A half shaft 60 is coupled to the driveshaft 46 and is also coupled to the vehicle engine and transmission.

The wheel hub assembly of FIGS. 1 and 2 also includes a wheel speed sensing mechanism for sensing the rotational speed of the hub 10. The wheel speed sensing assembly includes a segmented disc 66 that includes a mounting flange 68 mounted on the hub 10. As best seen in FIG. 2, the face of the segmented disc 66 has notches or grooves 70 in the face thereof. A sensor 74 is mounted on the housing 12 and extends into proximity with the segmented disc 66, as shown in FIGS. 1 and 2. The sensor 74 is connected to an antilock brake controller by cable 78.

As seen in FIG. 1, an annular shield 80 is provided on the housing 12 outboard of the segmented disc 66. As the hub 10 rotates, the segmented disc 66 will rotate with the hub 10 and notches 70 will pass in proximity with the sensor 74. As seen in both FIGS. 1 and 2, the sensor 74, and the segmented disc 66, and the notches 70 are exposed to the elements, such as dirt, road grime, or metallic particles that may be experienced during wear of the brake disc or drum 28. In FIG. 1, it is seen that a stamped metal slinger disc 84 is mounted on the driveshaft 46 for rotation with the driveshaft 46. The slinger disc 84 includes an outer flange 86 that fits closely within a recess 88 provided in the housing 12 inboard of the sensor 74 and segmented disc 66. As the driveshaft 46 rotates, the slinger disc 84 will also rotate and the slinger disc 84 will substantially block the intrusion of dirt, grime or metallic particles. Thus, in FIG. 1, the slinger disc 84 will function to shield the segmented disc 66, the sensor 74, as well as the bearing assembly 20, from the intrusion of foreign matter.

Referring again to FIG. 2, it is seen that there is no driveshaft 46, and, therefore, the segmented disc 66 and the sensor 74 are exposed to the elements. Thus, it would be desirable to provide protection for the segmented disc 66 and the sensor 74 in those vehicles that are not equipped with a driveshaft 46 and therefore do not have the slinger disc 84 of FIG. 1.

Figure 3:
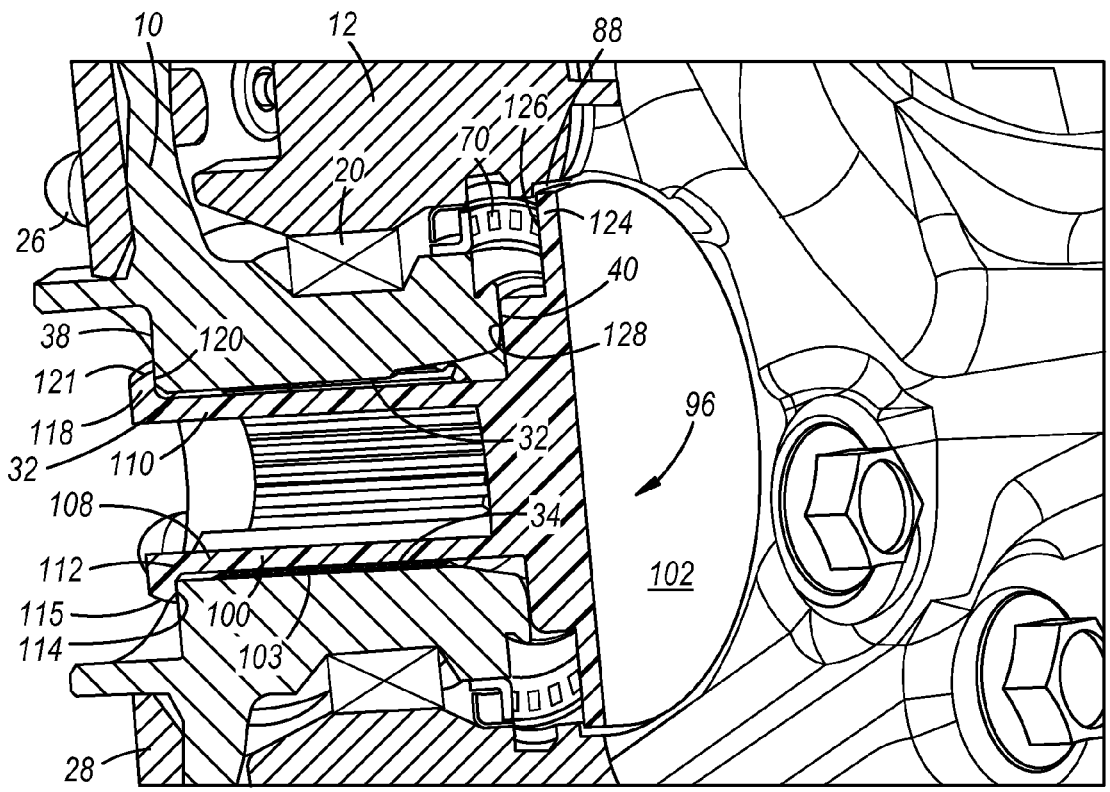
FIG. 3 is a view similar to FIG. 2 but showing the protective cap of this invention installed into the hub.
Figure 4:
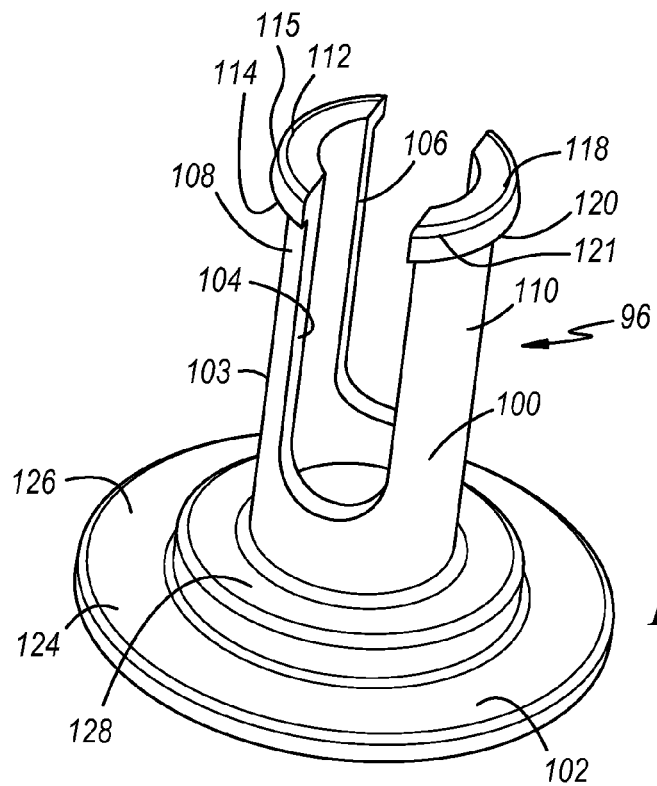
FIG. 4 is a perspective view of the protective cap of this invention.

As seen in FIGS. 3 and 4, a protective cap, generally indicated at 96, includes a stem 100 and a disc-shaped head 102. The stem 100 is a hollow tubular shape and has an outer cylindrical surface 103. Longitudinal extending slots 104 and 106 are provided in the stem 100, thereby dividing the stem 100 into a first leg 108 and a second leg 110. Leg 108 has a flange 112 defining a shoulder 114 and a chamfer 115. Leg 110 has a flange 118 defining a shoulder 120 and a chamfer 121.

As seen in FIGS. 3 and 4, the head 102 includes an outer distal rim portion 124 having an under face 126. The head 102 also has an annular abutment 128 that surrounds the stem 100 and is located radially inward from the distal rim 124.

As seen in FIG. 3, the protective cap 96 will be installed into the hub 10 in order to provide protection against the intrusion of dirt, grime, or metallic particles into the segmented disc 66, sensor 74, and bearing assembly 20. In FIG. 3, the stem 100 has been inserted through the bore 32 of hub 10. During the insertion of the stem 100, the chamfers 115 and 121 of the stem legs 108 and 110 bear against the inner end face 40 of the hub 10 to bias the legs 108 and 110 radially inward so that the flanges 112 and 118 can enter the bore 32. FIG. 3 shows the protective cap 96 96 fully inserted so that the abutment 128 is engaged against the inner end face 40 and the legs 108 and 110 have sprung radially outward so that their shoulders 114 and 120 engage with the outer end face 38 of the hub 10. In addition, it will be seen that the outer surface 103 of the stem 100 engages against the inside of the splines 34 so that the protective cap 96 is positively located and centered within the hub 10 against shifting movement. Furthermore, as seen in FIG. 3, the distal rim portion 124 of the protective 96 is established in close-fitting proximity with the recess 88 of the housing 12, so that the distal rim portion 124 is free to rotate relative the stationary housing 12, and yet is close enough to block the intrusion of foreign matter into the segmented disc 66, sensor 74, and bearing assembly 20.

Thus, it is seen that the invention provides an easily installed protective cap that can be employed in those vehicle wheel hub systems that do not receive a driveshaft as in FIG. 1. It will be understood that the drawings herein show one embodiment of the invention and alternative structures can be employed for manufacture of the protective cap. For example, FIG. 4 shows two slots provided in the stem 100 so as to define two legs 108 and 110. Alternatively, additional slots can be provided to thereby define three legs or four legs. In addition, although the protective of FIG. 4 has the legs 108 and 110 yielding during insertion of the stem 100, it may be desirable to provide a more rigid stem 100 and to provide yieldable retaining shoulders only at the outermost ends of the legs 108 and 110 for engaging with the outer end face 38 of the hub 10.

What is claimed is:

1. A protective cap for protecting a bearing that mounts a wheel hub for rotation in a housing and for protecting a speed sensor system having a segmented disc fixed to the hub and rotating therewith and a sensor mounted on the housing and extending into proximity with the segmented disc, said protective cap comprising:
   a stem for insertion through a central bore of the hub;
   a disc-shaped head mounted on the stem and having an under face for engaging with an inner end face of the hub;
   and a distal rim portion extending into overlapping proximity with the housing to allow rotation of the distal rim portion relative the housing and yet prevent entry of dirt to the speed sensor system and bearing;
   said stem having yieldable retainers thereon for engaging with the outer end face of the hub upon insertion of the stem through the central bore and engagement of the under face with the inner end face of the hub so that the distal rim portion is maintained in the overlapping proximity with the housing to prevent the intrusion of dirt to the speed sensor system and bearing.

2. The protective cap of claim 1 further comprising said stem having an outer cylindrical surface engaging with the central bore of the hub to locate the disc-shaped head of the protective cap radially with respect to the hub and the housing.

3. The protective cap of claim 1 further comprising said stem being hollow and having a plurality of longitudinal slots therein defining a plurality of legs that yield radially toward and away from the central bore of the hub, each leg having a flange providing a shoulder that engages with the outer face of the hub when the protective cap is installed to retain the protective cap in an installed position.

4. The protective cap of claim 3 further comprising a chamfer provided on each flange for engaging with the inner face of the hub upon insertion of the stem to force the plurality of legs radially inwardly to enable insertion of the stem into the central bore.

5. The protective cap of claim 1 further comprising said stem having an outer cylindrical surface engaging with the central bore of the hub to locate the disc-shaped head of the protective cap radially with respect to the hub and the housing, and said hollow stem having a plurality of longitudinal slots therein defining a plurality of legs that yield radially toward and away from the central bore of the hub, each leg having a flange providing a chamfer for engaging with the inner face of the hub upon insertion of the stem to force the plurality of legs radially inwardly, and each flange having a shoulder that engages with the outer face of the hub when the protective cap is installed to retain the protective cap in the installed position.

6. In combination:
   a housing having a housing bore;
   a hub for mounting a vehicle wheel, said hub having an outer end face, an inner end face, and a central bore having splines for engagement by a splined driveshaft;
   a wheel bearing acting between the housing bore and the hub to mount the hub for rotation within the housing bore;
   a speed sensor system having a segmented disc fixed to the hub and rotating therewith and a sensor mounted on the housing and extending into proximity with the segmented disc;
   and a protective cap for protecting the bearing and the speed sensor system, said protective cap including a stem for insertion through the central bore and a disc-shaped head having an under face for engaging with the inner end face of the hub, and a distal rim portion extending into overlapping proximity with the housing to allow rotation of the distal rim portion relative the housing and yet prevent entry of dirt to the speed sensor system and bearing, said stem having yieldable retainers thereon for engaging with the outer end face of the hub upon insertion of the hollow stem through the central bore and engagement of the under face with the inner end face of the hub so that the distal rim portion is maintained in the overlapping proximity with the housing to prevent the intrusion of dirt to the speed sensor system and bearing.

7. The protective cap of claim 6 further comprising said stem having an outer cylindrical surface engaging with the central bore of the hub to locate the disc-shaped head of the protective cap radially with respect to the hub and the housing.

8. The protective cap of claim 6 further comprising said stem being hollow and having a plurality of longitudinal slots therein defining a plurality of legs that yield radially toward and away from the central bore of the hub, each leg having a flange providing a shoulder that engages with the outer face of the hub when the protective cap is installed to retain the protective cap in an installed position.

9. The protective cap of claim 8 further comprising a chamfer provided on each flange for engaging with the inner face of the hub upon insertion of the stem to force the plurality of legs radially inwardly to enable insertion of the stem into the central bore.

10. The protective cap of claim 6 further comprising said stem having an outer cylindrical surface engaging with the central bore of the hub to locate the disc-shaped head of the protective cap radially with respect to the hub and the housing, and said hollow stem having a plurality of longitudinal slots therein defining a plurality of legs that yield radially toward and away from the central bore of the hub, each leg having a flange providing a chamfer for engaging with the inner face of the hub upon insertion of the stem to force the plurality of legs radially inwardly, and each flange having a shoulder that engages with the outer face of the hub when the protective cap is installed to retain the protective cap in the installed position.

11. In combination:
a housing having a housing bore;
a hub for mounting a vehicle wheel, said hub having an annular sleeve portion extending into the bore of the housing and the sleeve portion having an outer end face, an inner end face, and a central bore having splines for engagement by a splined driveshaft;
a wheel bearing acting between the housing bore and the hub to mount the hub for rotation within the housing;
a speed sensor having a segmented disc fixed to the hub and rotating therewith, and a sensor fixed to the housing and extending into sensing proximity with the segmented disc;
and a protective cap for protecting the bearing and the speed sensor, said protective cap including a hollow stem for insertion through the central bore and a disc-shaped head having an under face for engaging with the inner end face of the hub and a distal rim portion extending into overlapping proximity with the housing to allow rotation of the hub relative the housing and yet prevent entry of dirt to the speed sensor and bearing, said hollow stem having an outer cylindrical surface engaging with the central bore of the hub to locate the disc-shaped head of the protective cap radially with respect to the hub and the housing and yieldable retainers provided on the hollow stem for engaging with the outer end face of the hub upon insertion of the hollow stem through the central bore and engagement of the under face with the inner end face of the hub so that protective cap is retained upon the hub with the distal rim portion in overlapping proximity with the housing.

12. The combination of claim 11 further comprising said stem being hollow and having a plurality of longitudinal slots therein defining a plurality of legs that yield radially toward and away from the central bore of the hub, each leg having a flange providing a shoulder that engages with the outer face of the hub when the protective cap is installed to retain the protective cap in an installed position.

13. The combination of claim 12 further comprising a chamfer provided on each flange for engaging with the inner face of the hub upon insertion of the stem to force the plurality of legs radially inwardly to enable insertion of the stem into the central bore.

14. The combination of claim 11 further comprising said stem having an outer cylindrical surface engaging with the central bore of the hub to locate the disc-shaped head of the protective cap radially with respect to the hub and the housing, and said hollow stem having a plurality of longitudinal slots therein defining a plurality of legs that yield radially toward and away from the central bore of the hub, each leg having a flange providing a chamfer for engaging with the inner face of the hub upon insertion of the stem to force the plurality of legs radially inwardly, and each flange having a shoulder that engages with the outer face of the hub when the protective cap is installed to retain the protective cap in the installed position.

* * * * *